Aug. 4, 1964  N. KRUPNIK  3,143,357
GLIDING VEHICLE FOR USE ON SNOW, ICE OR WATER
Filed April 18, 1962  2 Sheets-Sheet 1
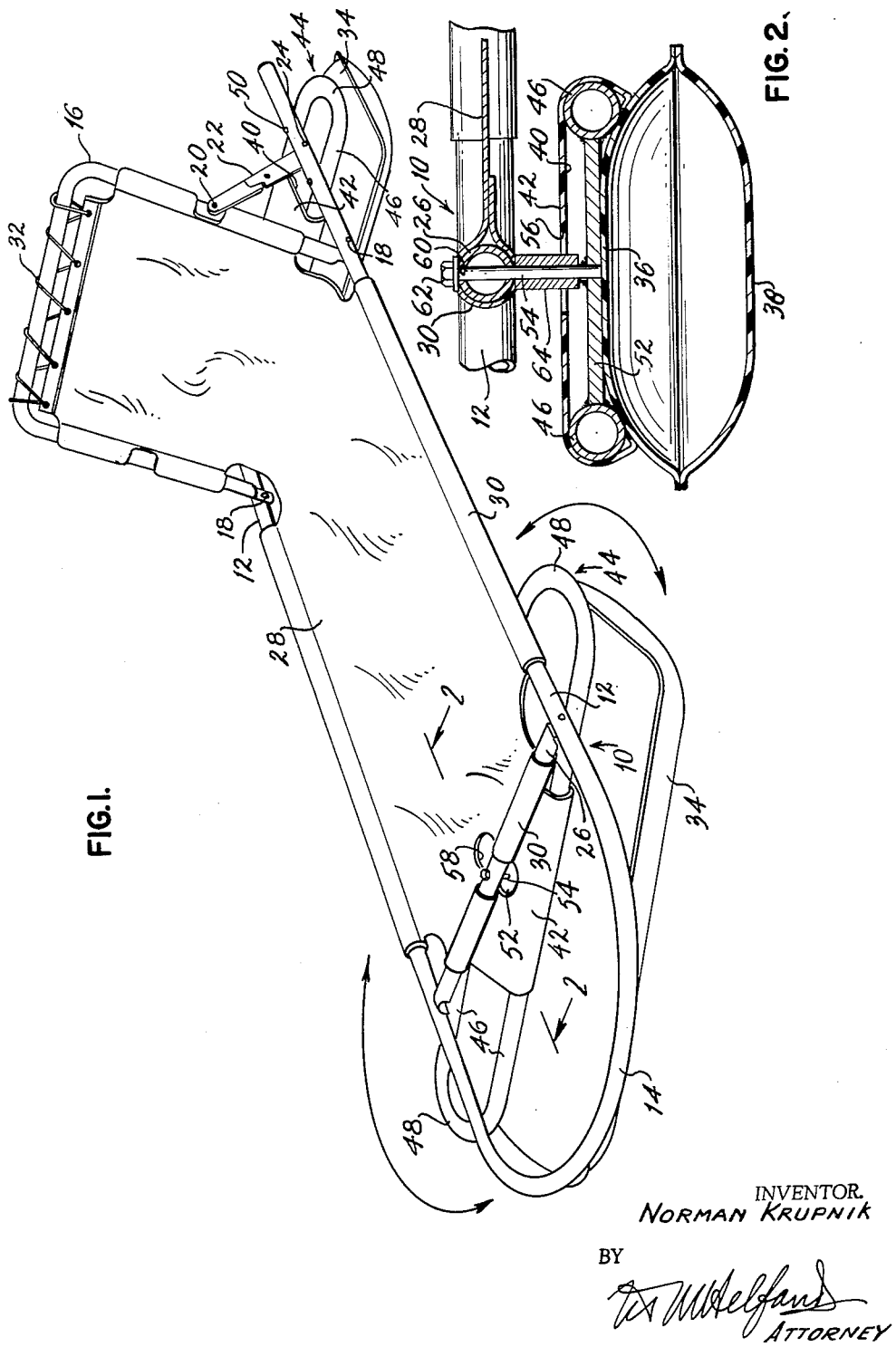
INVENTOR.
NORMAN KRUPNIK
BY
[signature]
ATTORNEY

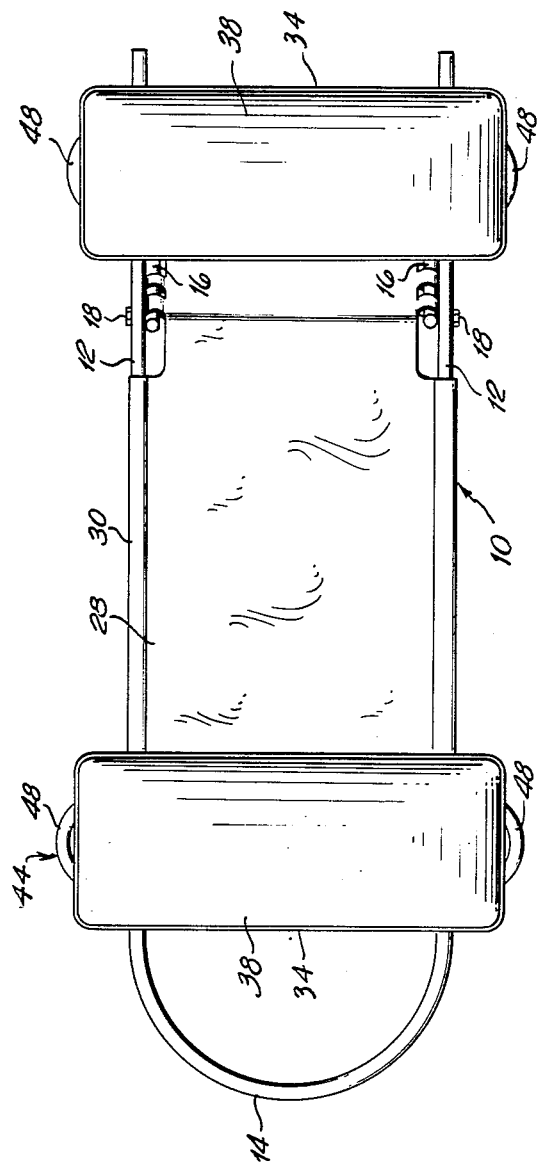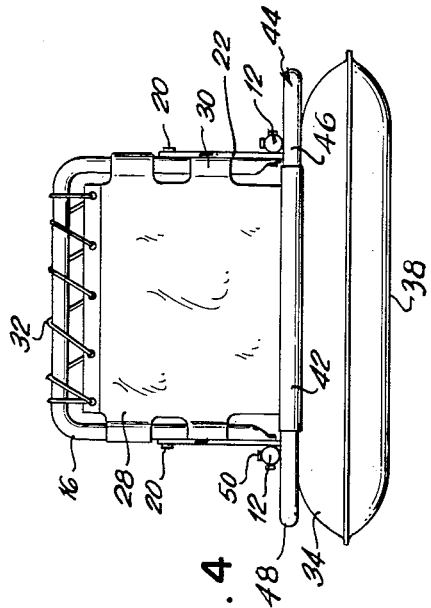

United States Patent Office 3,143,357
Patented Aug. 4, 1964

3,143,357
GLIDING VEHICLE FOR USE ON SNOW,
ICE OR WATER
Norman Krupnik, 13118 Rangoon St., Pacoima, Calif.
Filed Apr. 18, 1962, Ser. No. 188,321
6 Claims. (Cl. 280—16)

The present invention relates to a gliding vehicle and, particularly, to a steerable gliding vehicle of a type that may be used for gliding over a surface.

It is one object of the present invention to provide a vehicle of the character described which will readily and easily glide or move over either a snow-covered or water surface.

It is also an object of the present invention to provide a vehicle of the character described that may be both propelled and steered by the occupant with ease and convenience.

It is another object of the present invention to provide a vehicle of the character described which will provide pneumatically-cushioned, comfortable support for the occupant.

It is still another object of the present invention to provide a vehicle of the character described which is of light weight and which may be easily and quickly compacted for convenience in transportation, and for storage.

It is a further object of the present invention to provide a vehicle of the character described which is formed of few, simple and relatively low-cost parts that may be quickly and easily assembled and may, therefore, be produced at relatively low cost.

The foregoing and other objects and advantages of the gliding vehicle of the present invention will become more readily apparent to those skilled in the art from the embodiment thereof shown in the accompanying drawings and from the description following. It is to be understood, however, that such embodiment is shown by way of illustration only, to make the principles and practice of the invention more readily comprehensible, and without any intent of limiting the invention to the specific details therein shown.

In the drawings:

FIG. 1 is an isometric view of one embodiment of a vehicle of the present invention;

FIG. 2 is a section, on an enlarged scale, taken on line 2—2 of FIG. 1;

FIG. 3 is a bottom plan view of the vehicle of FIG. 1; and

FIG. 4 is a rear view of the same.

Generally stated, the invention takes advantage of the fact that certain synthetic plastic sheet materials such as heavy-duty sheet vinyl, are air and water impervious and are thus suitable for forming pneumatic floats and also have a surface that is highly suitable for gliding over snow or similar damp surfaces. With these characteristics in view, the present invention contemplates the provision of a body-supporting platform comprising an elongated frame with a body-holding web secured thereacross and a pair of inflatable floats or pontoons formed of synthetic plastic material, one of which is secured transversely across the platform at one end thereof and the other rotatably supported for steering, across the other end of the platform.

More specifically, and with reference to the embodiment of the invention illustrated in the drawing, the vehicle is shown to comprise a lounge or platform, comprising an elongated frame, generally designated as 10, which is preferably formed of a unitary, tubular rod of light weight, as of aluminum, which is bent into U-shape to form the spaced sides 12 and a preferably arched connecting end section 14 at least at the front end of the frame. The frame 10 may be provided, if desired, with an adjustable back-rest consisting of a relatively shorter U-shaped frame 16, that may be preferably formed of the same tubular material as the main frame 10. The back-rest frame 16 is pivotally connected by the ends of its sides, as at 18, to the sides 12 of the main frame 10, adjacent their rear ends. Foldable links 22 are each connected pivotally, by one end, to a mid-point of one of the sides of the back-rest frame 16, as at 20, and by the other end to the adjacent side 12 of the main frame 10, as at 24. A transverse, preferably tubular member 26 is supported between the sides of the main frame 10 at a point adjacent their forward ends.

A preferably unitary body-supporting web 28, preferably of waterproof fabric or synthetic plastic material, is secured across the back-rest frame 16 and the portion of the frame 10 forwardly thereof, and to the cross-piece 26. The web 28 may be secured in place, in any desired manner, as by the sleeve portions 30 thereof, formed at its front and at its sides which fit over the appropriate portions of the frame, and by lacings 32 by which it may be connected to the transverse side of the back-rest frame 16.

The vehicle of the invention also comprises forward and rear floats 34, each of which is preferably formed of inflatable, air-tight fabric, preferably a smooth-surfaced synthetic fabric, such as a heavy-duty vinyl fabric. The floats 34 are each preferably formed to be, when inflated, of pillow-shape, with flattened top and bottom wall portions 36 and 38. While the floats 34 may be permanently inflated, it is preferable to provide them with air valves through which they may be inflated or deflated, as desired, in a manner that will be well understood by those skilled in the art and not thought necessary to be specifically illustrated. Each of the floats 34 may preferably be of elongated shape and may have provided on its top surface 38 a longitudinally-extending, relatively wide, flat sleeve 40, preferably formed by a rectangular sheet of fabric 42 that is secured by two of its opposed edges longitudinally of the float. Each of the floats 34 is mounted by its sleeve 40 on a supporting frame, generally designated as 44, which comprises a pair of spaced side rods 46, preferably of the same lightweight tubular material as the frame 10, which are suitably spaced by interconnecting end portions 48 to fit snugly within the sleeve 40; the frame 44 being of a length greater than the distance between the main frame sides 12.

One of the float-supporting frames 44 is fixedly secured transversely of the frame 10, at the rear thereof, by the end portions of its sides 46, which are secured to the main frame sides 12, as at 50. Such connections 50 may preferably be of a readily disconnectable type, as a bolt and nut connection, to make possible float replacement when required. The frame 44 of the other of the floats 34 has a rigid, preferably metallic plate 52 secured between the center portions of its sides 46. An upright post 54 is secured in any desired manner in the center of the plate 52. The post 54 extends through a registering opening 56 formed in the sleeve fabric 42, through an opening 58 in the body-supporting web 28 and into the opening 60 in the cross-piece 26. The projecting end of the post 54, above the cross-piece 26, may be threaded for engagement by a nut 62 to maintain the assembly in place. A tubular, spacing washer and bearing 64, which may be of any suitable material but preferably of nylon, may be mounted over the post 54 intermediate the plate 52 and the crosspiece 26.

It will be readily apparent that the vehicle of the present invention may be conveniently and enjoyably used on the water, being capable of propulsion by the occupant, manually or pedally, by the rotating of the forward of the two floats 34 about the post 54.

It has also been found that the vehicle of the present invention may be expeditiously used over a snow surface; the smooth surface of the synthetic plastic material gliding easily and effectively over such surface either under the effect of gravity, as on a slope, or by manual propulsion, on the level; the vehicle being steerable in the same manner as described above.

It will also be apparent that the floats 34 provide a comfortable pneumatically-cushioned support when riding over waves or bumps.

It will likewise be apparent that the vehicle of the present invention is of light weight; that it may be readily compacted by the deflation of the floats for convenient storage and transportation; that it is formed of few, simple parts of low-cost material that may be easily shaped or formed, and easily and economically assembled.

It will be further apparent that numerous varations and modifications in the gliding vehicle of the present invention may be made by anyone skilled in the art, in accordance with the principles of the invention hereinabove set forth, and without any inventive ingenuity. I desire, therefore, to be protected for any and all such modifications and variations that may be made within the spirit of the invention and scope of the claims hereto appended.

What I claim is:

1. A vehicle of the character described comprising a body-supporting platform, said platform comprising a frame including spaced side members, a fabric web supported between said spaced frame side members, a pair of floats, each comprising a pneumatic cushion formed with a smooth-surfaced, surface-contacting bottom section, means supporting one of said floats at one end of said platform comprising spaced, rigid rod elements secured transversely of said platform at one end thereof, and means provided on the upper portion of said float engageable over said spaced rod elements, a second pair of rod elements, and means connecting said rod elements to one another, said second pair of rod elements pivotally supported at the opposed end of said platform for rotation in a plane perpendicular to said platform, said second float having means provided on its upper portion engageable over said second pair of rod elements.

2. The vehicle of claim 1, wherein said bottom section comprises smooth-surfaced sheet material.

3. The vehicle of claim 1, wherein said surface contacting section comprises plastic sheet material.

4. The vehicle of claim 1, wherein the means supporting said floats on said rod elements comprises a fabric sleeve formed on the upper surface of each of said floats, said sleeve snugly fitting over said rod elements.

5. The vehicle of claim 1, wherein said rod elements supporting said second float project from the sides of said platform, to be engageable for rotation relative to said platform.

6. The vehicle of claim 1, wherein a backrest is pivotally and adjustably supported on said frame sides at the end of said platform adjacent said fixed float-supporting rod elements.

References Cited in the file of this patent

UNITED STATES PATENTS

| | | |
|---|---|---|
| 981,360 | Barney | Jan. 10, 1911 |
| 1,345,825 | Beau | July 6, 1920 |
| 1,655,228 | Johnson | Jan. 3, 1928 |
| 2,826,423 | Erickson | Mar. 11, 1958 |
| 2,974,331 | Dize | Mar. 14, 1961 |

FOREIGN PATENTS

| | | |
|---|---|---|
| 218,879 | Austria | Dec. 27, 1961 |
| 237,187 | Germany | July 31, 1911 |
| 310,317 | Germany | Jan. 13, 1919 |